United States Patent
LeBlanc et al.

(10) Patent No.: US 10,955,575 B2
(45) Date of Patent: Mar. 23, 2021

(54) AUDITORY MONITORING OF DOWNHOLE CONDITIONS THROUGH A FIBER OPTIC CABLE

(71) Applicant: Halliburton Energy Services, Inc., Houston, TX (US)

(72) Inventors: Michel Joseph LeBlanc, Houston, TX (US); Daniel Joshua Stark, Houston, TX (US); Sean Gregory Thomas, Georgetown, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/747,109

(22) PCT Filed: Aug. 12, 2016

(86) PCT No.: PCT/US2016/046839
§ 371 (c)(1),
(2) Date: Jan. 23, 2018

(87) PCT Pub. No.: WO2018/031039
PCT Pub. Date: Feb. 15, 2018

(65) Prior Publication Data
US 2020/0088894 A1   Mar. 19, 2020

(51) Int. Cl.
*E21B 47/135* (2012.01)
*G01V 1/22* (2006.01)
(Continued)

(52) U.S. Cl.
CPC .......... *G01V 1/226* (2013.01); *E21B 17/206* (2013.01); *E21B 47/07* (2020.05); *E21B 47/135* (2020.05);
(Continued)

(58) Field of Classification Search
CPC  G01L 1/246; G01V 1/226; G01V 2210/1429; E21B 17/206; E21B 47/123;
(Continued)

(56) References Cited

U.S. PATENT DOCUMENTS

| 4,811,694 A | * | 3/1989 | Holmquist | ............. A01K 29/00 116/1 |
| 2002/0040963 A1 | | 4/2002 | Clayton et al. | |

(Continued)

FOREIGN PATENT DOCUMENTS

| CA | 2485664 C | 7/2011 |
| WO | WO 2004/020789 A2 | 3/2004 |

OTHER PUBLICATIONS

International Search Report and the Written Opinion of the International Search Authority, or the Declaration, dated May 12, 2017, PCT/US2016/046839, 16 pages, ISA/KR.

*Primary Examiner* — Suman K Nath
(74) *Attorney, Agent, or Firm* — Haynes and Boone, LLP

(57) ABSTRACT

Disclosed are methods and apparatus for using an audible signal to monitor conditions at a downhole location in a well through use of a well cable containing a fiber optic, which may be either a slickline or a wireline fiber-optic cable, and providing an audible signal which varies in response to the monitored condition. The condition monitored can be strain in the fiber optic well cable, which can be sensed in one or more locations in the fiber optic well cable, in many examples through use of a sensor such as a Bragg grating associated with or formed in an optical fiber within the well cable. In some examples, a temperature measurement may be used to compensate for temperature effects impacting the strain measurement.

21 Claims, 4 Drawing Sheets

(51) Int. Cl.
*E21B 17/20* (2006.01)
*E21B 47/07* (2012.01)
*E21B 49/00* (2006.01)

(52) U.S. Cl.
CPC ...... *E21B 49/00* (2013.01); *G01V 2210/1429* (2013.01)

(58) Field of Classification Search
CPC .. E21B 47/065; E21B 49/00; G01N 2223/607
USPC .............................. 73/152.16, 726, 760, 781
See application file for complete search history.

(56) References Cited

U.S. PATENT DOCUMENTS

| | | |
|---|---|---|
| 2010/0107754 A1 | 5/2010 | Hartog et al. |
| 2012/0086443 A1* | 4/2012 | Bazzone ............... G01J 1/0492 324/244.1 |
| 2012/0147924 A1 | 6/2012 | Hall |
| 2012/0179378 A1 | 7/2012 | Duncan et al. |
| 2012/0218112 A1* | 8/2012 | Kresge ................... G01L 7/163 340/626 |

\* cited by examiner

AUDITORY MONITORING OF DOWNHOLE CONDITIONS THROUGH A FIBER OPTIC CABLE

CROSS-REFERENCE TO RELATED APPLICATION

The present application is a U.S. National Stage patent application of International Patent Application No. PCT/US2016/046839, filed on Aug. 12, 2016, the benefit of which is claimed and the disclosure of which is incorporated herein by reference in its entirety.

BACKGROUND

The present disclosure relates generally to methods and apparatus for using an audible signal to identify the status of one or more conditions in a well monitored through use of a fiber optic well cable; and more particularly relates, in at least some embodiments, to methods and apparatus for providing an audible signal responsive to a strain detected in a fiber optic well cable at the downhole location. In some examples, such strain may be detected in locations such as at, or near, a cablehead attaching the fiber optic well cable to a downhole tool, such as a logging tool or servicing tool.

In many types of well operations performed using a downhole tool supported by a wireline or slickline there can be a challenge in understanding what conditions exist proximate the tool. These challenges can be even more pronounced when using slickline, as there is no electrical connection between the surface and the tool to facilitate communication with sensors in or proximate the tool.

One particular condition that would be useful to understand during well operations is any strain that the slickline or wireline is experiencing at the tool location. For example, a collapse of some portion of a well sidewall could restrict movement of a logging or service tool. Merely monitoring tension on the slickline or wireline at the surface is only a general indicator as to what conditions may exist at the location of the tool. In other situations, a servicing tool may be used to perform a downhole operation. For example, fishing tools may be used to recover components lost in the well, or cable-conveyed hydraulic or mechanical jars may be used to provide an impact to help free a stuck component. In these operations, an indicator of the strain on the wireline or slickline proximate the servicing tool would be of great benefit to an operator; and it would be of particular benefit for the indicator to provide an audible signal representative of conditions affecting the wireline or slickline and/or the attached logging or servicing tool.

BRIEF DESCRIPTION OF THE DRAWINGS

FIG. 3A is a schematic representation of an example fiber optic strain monitoring system as may be used in the well logging system of FIG. 1; while

DETAILED DESCRIPTION

Figure 1:
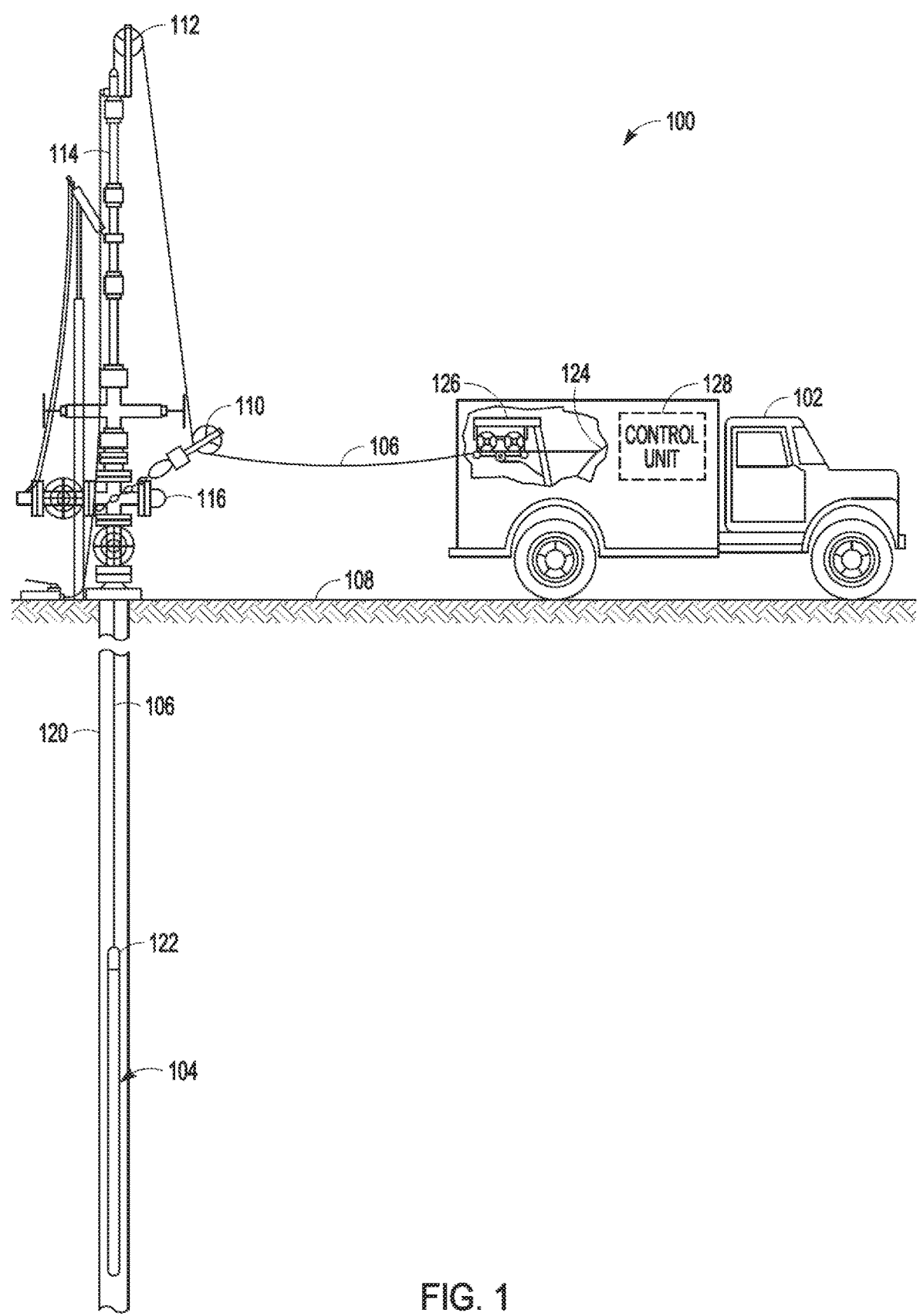
FIG. 1 is a schematic representation of an example well logging system, which is one example environment in which the present system may be utilized.

The present disclosure describes new methods and apparatus for using an audible signal to monitor conditions at a downhole location through the use of a fiber optic well cable and providing an audible signal which varies in response to the monitored condition. In some examples, the condition monitored will be strain in the fiber optic cable, which can be sensed in various locations in the fiber optic cable. For purposes of the present description, the system will be described in the context of a strain sensor, which includes a coupling to the optical fiber within the cable head used to couple the fiber optic cable to a logging tool or servicing tool.

The terms "well tool" and "downhole tool" will be used herein to refer to any tool suspended from a fiber optic well cable, and expressly includes one or more logging tools (examples of which are discussed below), or servicing tools (such as fishing tools, jars, actuators or release mechanisms, etc.), or combinations of both.

Additionally, the system will be described in reference to a "slickline" fiber optic cable, having no electrical conductors therein, as that is one situation in which the new system described herein provides exceptional benefits not previously available. However, persons skilled in the art having the benefit of this disclosure will be able to recognize that the same principles may be applied to a wireline cable containing a fiber optic conductor. For purposes of the present description, the term "fiber optic well cable" expressly encompasses both wireline and slickline cables having one or more optical fibers therein.

The following detailed description describes example embodiments of the new apparatus for using an audible signal to monitor conditions at a downhole location through use of a fiber optic well cable in reference to the accompanying drawings, which depict various details of examples that show how the disclosure may be practiced. The discussion addresses various examples of novel methods, systems and apparatus in reference to these drawings, and describes the depicted embodiments in sufficient detail to enable those skilled in the art to practice the disclosed subject matter. Many embodiments other than the illustrative examples discussed herein may be used to practice these techniques. Structural and operational changes in addition to the alternatives specifically discussed herein may be made without departing from the scope of this disclosure.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

Referring now to FIG. 1, therein is depicted an example well logging system 100, in which well measurement operations are performed through use of a logging tool string 104, supported by a fiber optic well cable (incorporating an optical fiber, as discussed earlier herein) 106, carried by a logging truck 102 at the Earth's surface 108. For the description of FIGS. 1 and 2, the fiber optic well cable 106 will be described in the context of a slickline containing at least one optical fiber (a "fiber optic slickline"), though as noted above, the described methodology could also be used with a wireline having at least one optical fiber (a "fiber optic wireline").

FIG. 1 depicts a conventional operating environment in which the fiber optic slickline 106 is guided by a first Hay pulley 110, proximate the "Christmas tree" wellhead assembly 116 closing the top of the well 120, and a second Hay pulley 112 located the proximate the top of a lubricator stack 114 extending above the wellhead assembly 116, to direct the fiber optic slickline 106 with attached logging tool string 104 into wellbore 120. Fiber optic slickline 106 is coupled to logging tool string 104 through a cablehead 122. In many example systems in accordance with the present disclosure, one or more components of optical sensors will be coupled within the cablehead 122 to one or more optical fibers within fiber optic slickline 106.

Logging truck 102 includes a winch 124 configured to support and dispense fiber optic slickline 106. In most systems, the fiber optic slickline will be dispensed through or across a measurement device 126 to measure the dispensed fiber optic slickline, which is typically used as a measure of the depth of the logging tool string within the well 120, and also to measure tension on the fiber optic slickline. Associated with winch 124 will be appropriate structures (not illustrated) facilitating retrieving optical signals from fiber optic slickline 106 and communicating the signals to control unit 128. Control unit 128 provide the functionality of interrogating one or more optical elements by communicating optical input signals into the one or more optical fibers within fiber optic slickline 106, and receiving optical signals reflected in response to the input signals. Additionally, other processing steps may be performed within control unit 128, including correlating, conversion, and other analysis of received optical signals to provide audio signals correlated to at least some portion of the optical signals received through one or more optical fibers in fiber optic slickline 106.

Figure 2:
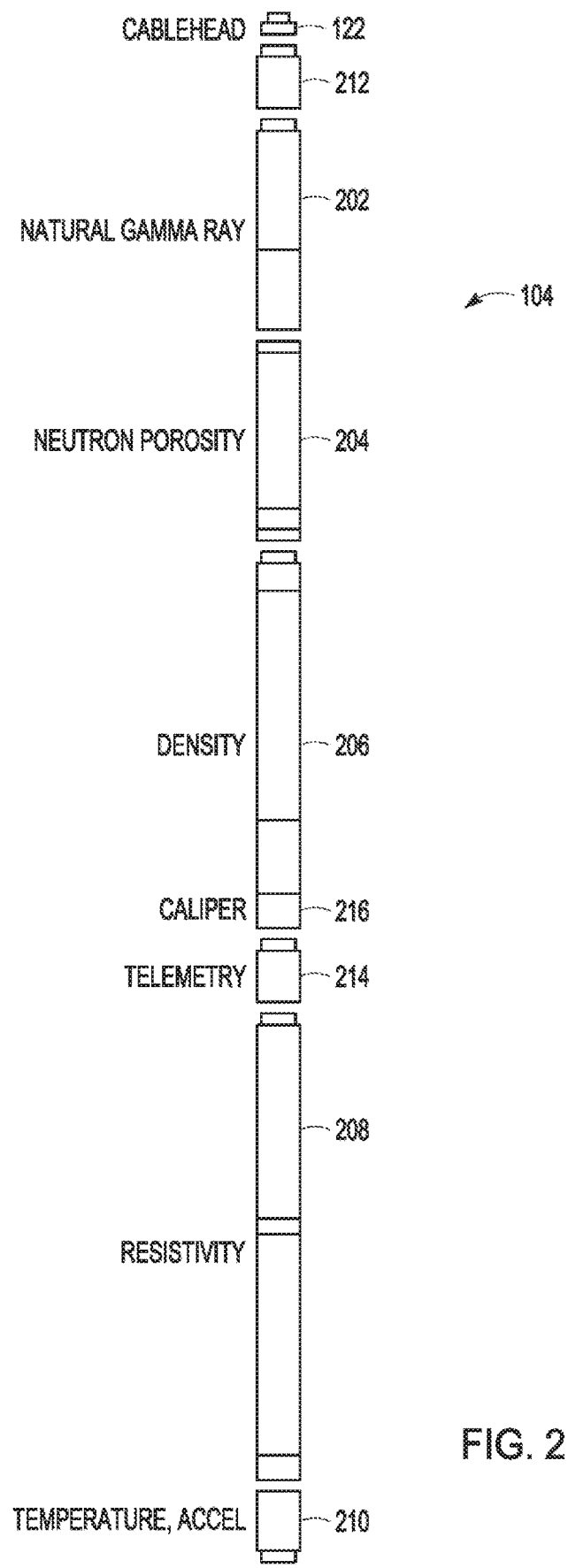
FIG. 2 is a side view representation of an example well logging tool string as might be used in the example well logging system of FIG. 1.

Referring now to FIG. 2, therein is depicted one example configuration for logging tool string 104 of FIG. 1. The depicted logging tool string 104 is representative of one option for a tool string configuration, but is provided only for purposes of illustration, as the logging tool string could be of virtually any configuration, and thus could include different types of logging tools, and could include only a single logging tool, or a greater number than those depicted. Logging tool string 104 is depicted with six logging tools: a natural gamma ray tool 202, a neutron porosity to 204, a density tool 206, resistivity tool 208 and a wellbore environment tool 210, such as can be used to measure downhole temperature, temperature acceleration, and in some cases tool orientation. In some examples, other types of normal monitoring tools, such as for example a caliper 216 may be included in the logging tool string 104. Such a caliper can either be an acoustic caliper (as illustrated), or in other embodiments can be a mechanical caliper.

In some embodiments, the logging tool string 104 can be one which begins logging in response to a stimulus, such as, for example a sequence of motions applied to the tool string; and which stores the obtained measurements from the logging tools downhole for later retrieval at the surface. Thus, in such embodiments, no telemetry along the slickline fiber optic 106 is required for the logging data. An alternative configuration, however, would be for logging tool string to include one or more telemetry modules, as indicated at 212 and 214, to facilitate telemetry across the optical fiber in fiber optic slickline 106. In such a system, measurements from the logging tools will be converted to digitized data, either in the logging tools or in either or both of the telemetry modules 212, 214. In one example embodiment, electrical measurements from multiple logging tools might be assembled together such as in lower telemetry module 214 from the logging tools below telemetry module 214, and then communicated to upper telemetry module 212, that would then convert the digital electrical signals from the logging tools into an optical signal according to an established protocol to facilitate communication of the data into one or more optical fibers at cablehead 122 for communication to the surface across fiber optic slickline 106.

Referring now to FIGS. 3A-D, FIG. 3A is a schematic depiction of an example embodiment of a novel strain monitoring system 300. Strain monitoring system 300 includes a surface control unit 302 and a downhole sensor, such as a grating sensor 304, which will be associated with the optical fiber of the fiber optic well cable (i.e. either fiber optic slickline, or fiber optic wireline), at a desired location along the cable. Surface control unit 302 includes components for interrogating grating sensor 304 by communicating input optical signals to the optical fiber and receiving signals reflected from downhole grating sensor 304. Grating sensor 304 will be coupled to the optical fiber such that strain in the optical fiber will be reflected in the optical grating. Optical grating 304 can be, or at least include, a Bragg grating; and in many examples, the Bragg grating will be incorporated into the optical fiber as a fiber Bragg grating (FBG), which is the structure that will be used for illustrative purposes in the remainder of this description. However, in other examples, the Bragg grating could be a separate member coupled to the optical fiber in a manner to be in optical communication with the optical fiber and also to be exposed to the strain experienced either by the optical fiber itself or by another portion of the fiber optic well cable. In any of the above alternatives, it can be seen that the Bragg grating is effectively functioning as a load cell, but one which is able to operate without any external or downhole tool power, and which is able to communicate measurements across the optical fiber to the surface.

When light is transmitted through the optical fiber and reaches the FBG, the light will reflect at the FBG at a wavelength given by the relation:

$$\lambda_B = 2n_{eff}\Lambda_G \qquad \text{eq. 1}$$

Where:
$\lambda_B$ represents the fundamental Bragg resonance wavelength;
$n_{eff}$ represents the effective index of refraction; and
$\Lambda_G$ represents the grating pitch (or period).

When a strain is induced in the optical fiber, that strain is reflected in the FBG, resulting in a change in the Bragg resonance wavelength that will be seen in the signal reflected by the FBG back to the surface. This variation in the Bragg resonance wavelength detected back at the surface directly reflects the strain-induced variations in the optical fiber (and therefore in the fiber optic well cable) at the location of the FBG. As noted in reference to FIG. 1, one desirable location for the FBG will typically be immediately proximate the tool string (whether it be a logging tool as described above, or a well servicing tool, such as a jar, a mechanical actuator, a closure mechanism, etc.). The FBG will be responsive to acoustic (or vibratory) strain induced in the fiber optic well cable (for example by some mechanical engagement or movement of a component); and will also be responsive to mechanical strain induced in the fiber optic well cable, such as if movement of the downhole tool was restricted such as by collapse of a portion of the well sidewall trapping the tool, or engagement with a downhole component which resists movement until a threshold force is applied, such as can be found with various types of valve actuator mechanisms and/or packer release mechanisms, as just some examples.

Figure 3A:
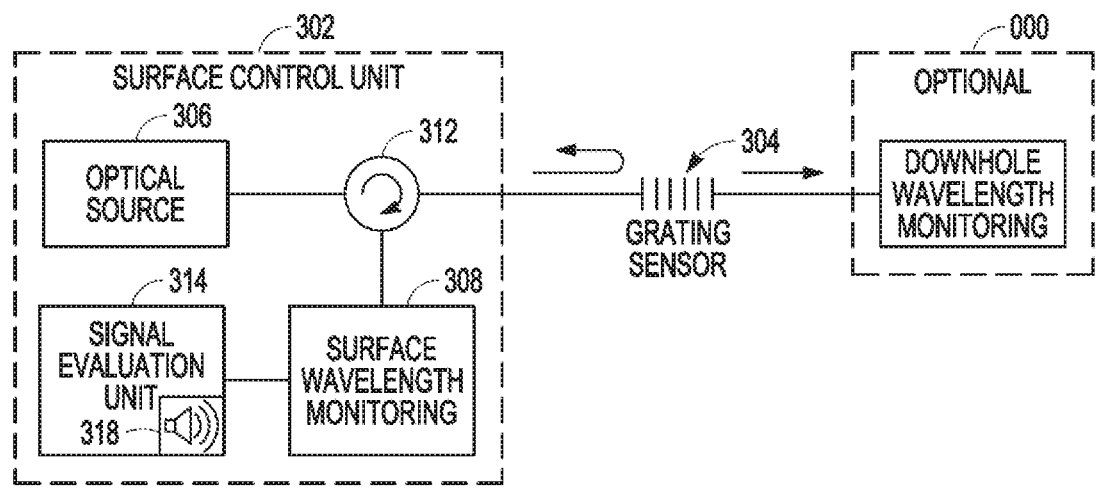
Figure 3B:
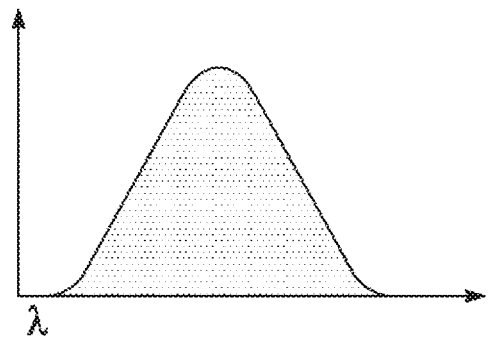
FIGS. 3B-D depict representative optical spectra present at different locations during operation of the fiber optic strain monitoring system of FIG. 3A.
Figure 3C:
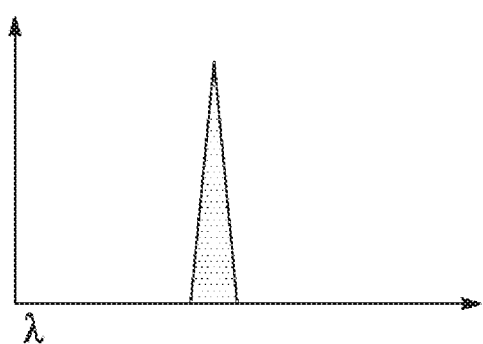

Referring again to FIGS. 3A and 3B, surface control unit 302 therefore includes an optical source emitting pulses of light in one or more wavelength bands, as may be desired for the system, as will be discussed further below. Each wavelength band will be across a range of wavelengths including not only the static resonance frequency (wavelength) of the FBG, but also across the range of potential wavelength shifts from the FBG. An example input wavelength spectrum is depicted in FIG. 3B. Because the FBG functions essentially as a notch filter for light reflected back to the surface, the FBG will cause a reflection back to the surface of the filtered peak (see FIG. 3C). Under conditions of no strain on the FBG, the reflected peak will be at the resonance frequency of the FBG. When the FBG is subjected to strain, the FBG will cause a shift in the wavelength of the reflected peak from the resonance frequency of the FBG generally correlating to the magnitude of strain on the FBG, and therefore also upon the fiber optic well cable. For a basic strain measurement, measurement from a single FBG will be sufficient.

As noted above, surface control portion 302 includes an optical interrogator including a wavelength monitoring unit 308 which, along with optical source 306, is optically coupled to at least one optical fiber in a fiber optic well cable through an optical signal routing device, such as a circulator 312. Surface control unit 302 further includes a signal evaluation unit 314 configured to generate an audio signal in response to optical signals received at wavelength monitoring unit 308. The audio signal will be conveyed to an output device 318, which may be of a desired form, such as a speaker or headphones, for example. In some examples, the generation of such an audio signal will include evaluating of the received optical signal to identify the frequency shift resulting from strain on the FBG, correlating the identified frequency shift with some reference to evaluate the magnitude, and thus the significance, of the strain; and generating an audio signal which varies in in response to the magnitude of the strain. In evaluating the magnitude of the strain, the measured frequency shift may be evaluated to a reference, such as a signal response when the tool sting is initially placed in the well, under minimal strain. In that circumstance, a later-measured frequency shift can be compared to the static measurement or to the initial sensor resonant wavelength, and the strain determined, either through an empirically derived functional relationship for that sensor type; or by reference to a look-up table or similar data repository to determine at least a relative strain measurement, or in some examples a quantitative strain measurement.

For some operations, such as jarring a stuck tool, an operator would primarily be concerned with sudden large changes in strain. Thus in those types of situations, only a measure of such strain, such as through the relation $\lambda B_{(t+\Delta t)} - \lambda B_{(t)}$ would be needed. In other situations, the magnitude of the change or the spectral content of the change could be examined which could correlate to the extent of the activity or to which type of activity. As just one example, an activity might be to identify whether a fishing tool is engaging a lost tool in the well during a fishing operation, or may be within an annulus or side pocket. In some systems, the tension in the cable could be recalibrated could be recalibrated by an empirically derived functional relationship, or determined through first principles. The calculations would be made using the returned wavelength and the material properties of the cable at the operating temperature.

The character of the audio signal may be of any desired form. For example, the audio signal might have a generally analog form, varying in amplitude (volume) or frequency (pitch) or both, in response to the magnitude of the strain. Such varying may be either linearly proportional to the strain, or varying according to an adapted scaling of the strain. This generally analog-type approach appears to be preferable for many applications, as it is capable of conveying significant information to an operator of the logging system. However, other approaches may be envisioned. For example, an audio tone might change incrementally in response to different thresholds of strain. And as another alternative, where such incremental strain information is adequate, even synthesized or recorded messages might be generated in response to such incremental thresholds of strain.

In addition to the auditory signal, once the strain is measured, it can be displayed in any desired manner, including as a digital or graphical representation on a monitor, as would conventionally be a portion of the control unit 128 within the logging truck 102 (both depicted in FIG. 1). Additionally, the measured strain proximate the cablehead might be beneficially displayed proximate a measure of the tension on the fiber optic well cable obtained through measurement system 12 (also depicted in FIG. 1).

Figure 3D:
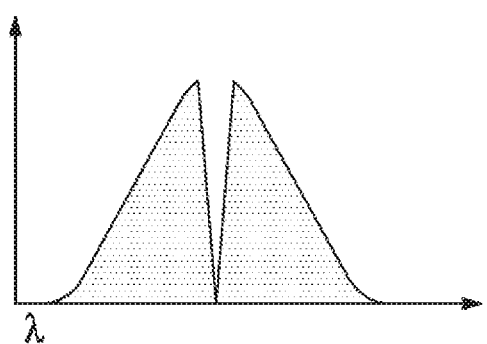

Referring again to FIG. 3A, the figure depicts an optional downhole wavelength monitoring unit 316. While the downhole wavelength monitoring unit 316 could be placed in a variety of locations, due to the need to connect to the fiber optic cable, it could conveniently be placed in the cablehead with appropriate adaptations. While not required for the described operations, a downhole wavelength monitoring unit 316 could provide additional information and functionality. For example, detecting the portion of the spectrum that is not filtered (i.e. reflected) by the FBG can provide a check on the integrity of the system as it relates to the communication of the spectrum. FIG. 3D depicts the portion of the signal that would be transmitted past the FBG, in which the wavelength(s) of the notch in the spectrum (and any shift thereof) correlate directly with the wavelength(s) and shift of the reflected peak of FIG. 3C. Additionally, the provision of a downhole wavelength monitoring unit 316 could be used to trigger or otherwise control operations within the downhole tool string in response to a detected strain exceeding an established threshold. Just as the wavelength of the peak reflected back to the surface provides a measurement of the strain; the notch of wavelengths not transmitted below the strain-measuring FBG provides the same measure of the strain. While many different uses can be envisioned, one example use would be for the cablehead to include not only the downhole wavelength monitoring unit 316 but also a battery-powered latch assembly coupled to the downhole wavelength monitoring unit 316. In the event that the downhole wavelength monitoring unit 316 were to detect a strain exceeding a predetermined threshold, the monitoring unit could transmit an electrical signal (for example) to the battery-powered latch assembly to cause the latch assembly to release, to allow the fiber optic well cable and/or some portion of the cablehead to separate from the remainder of the tool string.

The system has been described in the context of using a single FBG at the tool, such as at the cablehead, to give a localized strain measurement. In other systems, it may be desirable to measure strain at additional locations. In such examples, it may be desirable to use a distributed strain sensing (DSS) system to detect strain along the fiber, as addressed in more detail relative to FIG. 4 later herein. But even without using such a DSS system, additional FBG's may be associated at various locations along the fiber optic well cable, to provide localized information at such locations. In one expected likely configuration, each of the additional FBG's would have a unique pitch to the grating, such that signals reflected from each one can be identified as to the specific FBG. In such a system, the surface control unit can evaluate the received reflections to localize the signal to the specific signature of the respective FBG's.

Because the FBG is responsive to any environmental factors that result in a change in the pitch of the grating, the FBG provides a measure not only of vibratory or other mechanical strain, but also of temperature, which can also impact the pitch of the grating. This is reflected in the following relation:

$$\left[\frac{\Delta\lambda_B}{\lambda_B}\right] = C_S \epsilon + C_T \Delta T \quad \text{eq. 2}$$

In which:
$\Delta\lambda_B/\lambda_B$ represents the relative shift in the Bragg wavelength due to an applied strain ($\epsilon$);
$C_S$ represents the strain coefficient; and
$C_T$ represents the temperature coefficient (a combination of the thermal expansion coefficient of the optical fiber and a thermal-optic coefficient).

As a result, in some well environments, such as where significant temperatures are expected, or in which there may be relatively large temperature gradients, temperature has the potential to introduce a significant error into identification of the strain and/or the magnitude thereof. Therefore it may be desirable to address the implications of temperature on a strain measurement in some manner.

A first method of addressing the implications of temperature on the strain measurement would be to compensate for the effects of temperature. One method of compensating for temperature effects on the strain measurement would be through use of a second FBG in the optical fiber which is decoupled from the effects of strain on the well cable.

For example, if the fiber optic well cable is secured to the cablehead at a location below the above-described first FBG used for monitoring strain (such that the first FBG is exposed to strains experienced by the cable), then the second FBG may be located at a position below the securement point, thereby isolating the second FBG from the strains induced on the cable above the securement point. The second FBG would be configured to be responsive to a different wavelength than that to which the first FBG is responsive. As an alternative, if the fiber optic well cable included more than one optical fiber, the first and second FBG's could be located in separate fibers, and thereby interrogated separately from one another. As with the above embodiment, the second FBG would be terminated in such a manner as to be isolated from the strain to which the first FBG is exposed, so that dynamic impacts on the FBG are essentially limited to temperature-related effects. If telemetry is available, such as for an embodiment using a fiber optic wireline, then a downhole temperature reading can be taken using standard techniques and this value transmitted to the surface. The signal evaluation unit could use the received temperature measurement to adjust the reported strain measurement accordingly.

Figure 5:
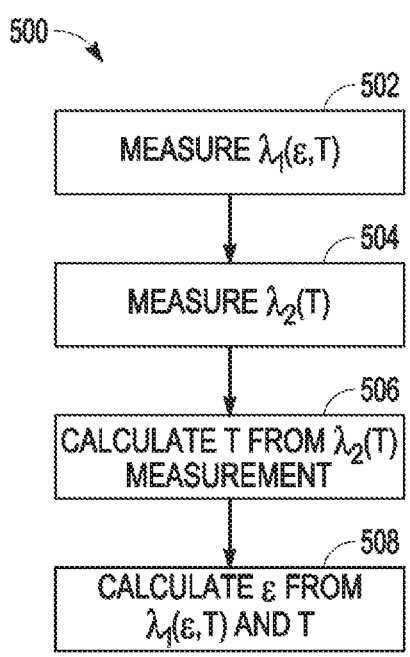
FIG. 5 depicts a flowchart of a temperature compensation methodology that may be used in an example fiber optic strain monitoring system.

Referring now to FIG. 5, which depicts a flowchart of an example of such a compensation method 500, the measurement from the first FBG at the first wavelength ($\lambda_1$) would be taken, with that measurement being subject to the effects of both the applied strain ($\epsilon$) and temperature (T), as indicated at 502. Additionally, the measurement from the second FBG at the second wavelength ($\lambda_2$) would be taken, as indicated at 504. Thus, the magnitude of the shift resulting from the temperature (T) can be calculated from the $\lambda_2$(T) measurement, as indicated at 506. By using the magnitude of wavelength shift to adjust the first wavelength shift measurement ($\lambda_1$), the magnitude of shift attributable to the strain can be known and the applied strain ($\epsilon$) can be determined, as indicated at 508. It should be recognized for some applications, determination of a quantitative strain value (such as through additional calculations or correlation with a lookup table, etc.) may not be required, and a relative measurement of the strain value may be sufficient.

Another alternative for providing compensation for temperature would be to implement Distributed Temperature Sensing (DTS) either in the same optical fiber or in a separate optical fiber within the fiber optic well cable. Such DTS systems use the optical fiber as a linear sensor, and detect temperature along an essentially continuous profile of the fiber. Such DTS systems typically rely upon measurements based on Raman scattering in the optical fiber, with different measurement techniques being utilized.

Another alternative for effectively providing correction for the effects of temperature which is particularly applicable to operations, as discussed earlier herein, wherein an operator is particularly concerned about dynamic changes, is to ignore changes of frequencies that take longer than a certain threshold, since thermal changes will occur much more gradually, and more slowly, then will tension changes. For example, ignoring changes in strain that take longer than one second to occur, may be sufficient to avoid thermal effects.

One other alternative that may be employed is to utilize a system configured to minimize temperature dependence on the cable properties. For example, a fiber-optic slickline formed of a carbon-fiber composite, which has a relatively low coefficient of thermal expansion of the composite in the axial direction (in the range −1 to +2µε/° C.), would minimize the thermal response of the fiber optic slickline itself, thereby reducing the need for specific temperature compensation.

Figure 4:
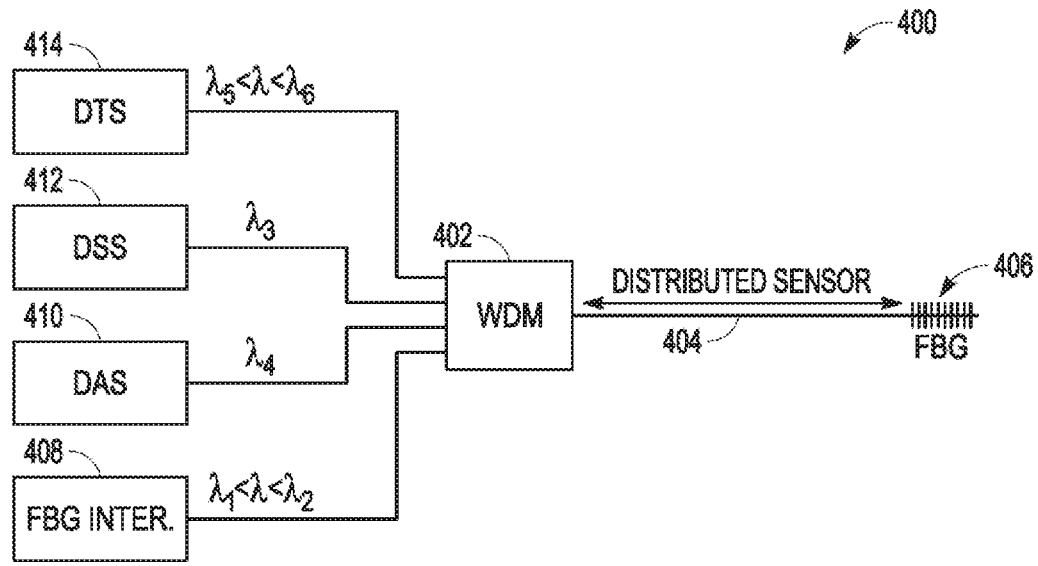
FIG. 4 is a schematic depiction of an example arrangement facilitating multiple optical sensing operations over a single optical fiber.

As noted above, in selected embodiments, it may be desirable to have one or more optical fibers in a fiber optic well cable that are carrying multiple wavelengths that are time and/or wavelength shifted relative to one another. Referring now to FIG. 4, that figure is a schematic representation of a relatively complex version of such a multiple wavelength optical system 400. Multiple wavelength system 400 uses a Wavelength Division Multiplexing (WDM) unit 402, to multiplex multiple wavelengths (and wavelength bands) onto an optical fiber. In the depicted example, the WDM unit 402 facilitates multiplexing four interrogators 408, 410, 412, 414 with a single optical fiber 404. The interrogator 408 for the basic strain measurement through an FBG sensor 406, utilizes a first wavelength band of $\lambda_1$ to $\lambda_2$. Similarly, a distributed temperature sensing (DTS) interrogator 414, as described above, will use a second wavelength band of $\lambda_5$ to $\lambda_6$. And as indicated in the schematic representation, other types of fiber optic measurements known in the industry may also be performed in this matter, such as through a distributed strain sensing (DSS) interrogator 412 that uses a single frequency ($\lambda_3$); and a distributed acoustic sensing (DAS) interrogator 410, again using a single frequency ($\lambda_4$). While, as noted, some DSS sensing mechanisms can operate with a single frequency, other DSS sensing systems such as those monitoring Brillouin backscatter would require a spectral band, rather than a single wavelength as in the depicted example. While each interrogator will functionally include an optical source and analysis system for the identified wavelength(s), it should be understood that separate optical sources are not necessarily required, and that in physical terms the system schematically depicted in FIG. 4 could include one or more optical sources, with at least one of the sources having capability of providing multiple wavelengths or wavelength bands.

The following numbered examples are illustrative embodiments in accordance with various aspects of the present disclosure:

1. A strain monitoring system, comprising (a) a well cable having at least one optical fiber therein, and having at least one optical sensor associated with the optical fiber; (b) a well tool coupled to the well cable, the well tool coupled through use of a coupling engaging the cable while leaving the optical sensor exposed to the effects of strain on the well cable; and (c) a surface control system, including (i) a first interrogator, including at least one light source coupled to provide an optical input signal to the optical fiber; (ii) an optical receiver operably coupled to receive signals reflected by the optical sensor through the optical fiber in response to an optical input signal, and (iii) an optical monitoring system identifying strain on the fiber optic well cable in response to the received reflected signals, and generating an audible signal having at least one characteristic that changes in response to the magnitude of the identified strain.

2. The system of example 1, wherein the optical sensor comprises a fiber Bragg grating.

3. The system of either of examples 1 or 2, wherein the well cable is a slickline cable.

4. The system of either of examples 1 or 2, wherein the well cable is a wireline cable.

5. The system of any of examples 1-4, further comprising a second optical sensor associated with an optical fiber in the well cable, the second optical sensor substantially isolated from strain in the well cable to be primarily responsive to temperature affecting the optical fiber.

6. The system of any of examples 1-5, (a) wherein the at least one light source emits optical input signals in a first band of wavelengths and a second band of wavelengths; (b) wherein the surface control system further comprises a second optical receiver; (c) wherein the optical sensor responsive to strain in the fiber optic well cable detects within the first band of wavelengths, and the optical sensor primarily responsive to temperature detects within the second band of wavelengths; and (d) wherein a first optical receiver is responsive to reflected signals within the first band of wavelengths, and a second optical receiver is responsive to reflected signals within the second band of wavelengths.

7. The system of any of examples 1-6, wherein the optical sensor responsive to strain in the fiber optic well cable and the optical sensor primarily responsive to temperature are each associated with the same optical fiber.

8. The system of any of examples 1-7, wherein the surface control system further comprises a Wavelength Division Multiplexer that multiplexes at least a second optical signal onto the optical fiber to perform a second optical measurement selected from the group consisting essentially of, a distributed temperature sensing measurement, a distributed strain sensing measurement, and a distributed acoustic sensing measurement.

9. The system of any of examples 1-8, wherein the well tool coupling engaging the fiber optic well cable is a cable head that engages the well tool.

10. The system of any of examples 1-9, wherein the well tool further comprises a downhole optical detector located downstream from the optical sensor, and arranged to receive the portion of the optical input signal that passes through the optical sensor.

11. The system of any of examples 1-10, wherein the at least one characteristic of the audible signal that changes in response to the magnitude of the identified strain changes generally continuously in response to the magnitude of the identified strain.

12. The system of any of examples 1-10, wherein the at least one characteristic of the audible signal changes in response to a determined absolute value of the identified strain changes.

13. A method for monitoring a well cable, comprising: (a) transmitting an optical input signal of a first one wavelength band across an optical fiber in the well cable, the well cable having a strain-responsive optical sensor operably coupled to the optical fiber; (b) receiving a returned optical signal from the strain-responsive sensor; (c) correlating the returned optical signal with a magnitude of strain exerted on the well cable; and (d) generating an audio signal having at least one characteristic that changes in response to the magnitude of the strain.

14. The method of example 13, further comprising: (a) receiving an optical temperature signal associated with the effects of temperature on the well cable containing the optical fiber; and (b) wherein correlating the returned optical signal from the strain-responsive optical sensor with a magnitude of strain exerted on the well cable comprises compensating for effects of temperature on the optical fiber in response to the received optical temperature signal.

15. The method of either of examples 13 or 14, wherein a well tool is coupled to the well cable, and wherein the strain-responsive optical sensor is situated proximate the coupling of the well cable to the well tool.

16. The method of any of examples 13-15, wherein receiving the optical temperature signal comprises transmitting a second optical signal of a second wavelength band across an optical fiber in the well cable to interrogate a second optical sensor, the second optical sensor arranged to be substantially isolated from the effects of strain on the well cable so as to be primarily responsive to effects of temperature on the well cable.

17. The method of any of examples 13-16, wherein the strain-responsive optical sensor and the second optical sensor primarily responsive to effects of temperature are associated with the same optical fiber.

18. The method of any of examples 13-17, wherein the strain-responsive optical sensor includes a fiber Bragg grating formed in the optical fiber.

19. The method of any of examples 13-18, wherein the strain-responsive optical sensor and the second optical sensor primarily responsive to effects of temperature are each fiber Bragg gratings formed in an optical fiber.

20. The method of any of examples 13-19, further comprising interrogating the optical fiber with a second optical input to perform a second optical measurement selected from the group consisting essentially of, a distributed temperature sensing measurement, a distributed strain sensing measurement, and a distributed acoustic sensing measurement.

21. The method of any of examples 13-20, wherein compensating for the effects of temperature comprises comparing a frequency shift of the received optical temperature signal to a frequency shift of a signal received from the strain responsive sensor and compensating the strain measurement for the effects of temperature.

Many variations may be made in the structures and techniques described and illustrated herein without departing from the scope of the inventive subject matter. Accordingly, the scope of the inventive subject matter is to be determined by the scope of the following claims and all additional claims supported by the present disclosure, and all equivalents of such claims.

We claim:

1. A strain monitoring system, comprising:
   a well cable having at least one optical fiber therein, and having at least one optical sensor associated with the optical fiber;
   a well tool coupled to the well cable, the well tool coupled through use of a coupling engaging the cable while leaving the optical sensor exposed to the effects of strain on the well cable;
   a surface control system, including,
   a first interrogator, including,
      at least one light source coupled to provide an optical input signal to the optical fiber;
      an optical receiver operably coupled to receive signals reflected by the optical sensor through the optical fiber in response to an optical input signal, and
      an optical monitoring system identifying strain on the fiber optic well cable in response to the received reflected signals and generating an audible signal having at least one audible characteristic, wherein the audible characteristic of the audible signal changes in response to the magnitude of the strain, the audible characteristic being audible to a human operator.

2. The strain monitoring system of claim 1, wherein the optical sensor comprises a fiber Bragg grating.

3. The strain monitoring system of claim 1, wherein the well cable is a slickline cable.

4. The strain monitoring system of claim 1, wherein the well cable is a wireline cable.

5. The strain monitoring system of claim 1, further comprising a second optical sensor associated with an optical fiber in the well cable, the second optical sensor substantially isolated from strain to which the first optical sensor is exposed so as to be primarily responsive to temperature affecting the optical fiber.

6. The strain monitoring system of claim 5,
   wherein the at least one light source emits optical input signals in a first band of wavelengths and a second band of wavelengths;
   wherein the surface control system further comprises a second optical receiver;
   wherein the optical sensor responsive to strain in the fiber optic well cable detects within the first band of wavelengths, and the optical sensor primarily responsive to temperature detects within the second band of wavelengths; and
   wherein a first optical receiver is responsive to reflected signals within the first band of wavelengths, and a second optical receiver is responsive to reflected signals within the second band of wavelengths.

7. The strain monitoring system of claim 5, wherein the optical sensor responsive to strain in the fiber optic well cable and the optical sensor primarily responsive to temperature are each associated with the same optical fiber.

8. The strain monitoring system of claim 1, wherein the surface control system further comprises a Wavelength Division Multiplexer that multiplexes at least a second optical signal onto the optical fiber to perform a second optical measurement selected from the group consisting essentially of, a distributed temperature sensing measurement, a distributed strain sensing measurement, and a distributed acoustic sensing measurement.

9. The strain monitoring system of claim 1, wherein the well tool coupling engaging the fiber optic well cable is a cable head that engages the well tool.

10. The strain monitoring system of claim 1, wherein the well tool further comprises a downhole optical detector located downstream from the optical sensor, and arranged to receive the portion of the optical input signal that passes through the optical sensor.

11. The strain monitoring system of claim 1, wherein the at least one characteristic of the audible signal that changes in response to the magnitude of the identified strain changes generally continuously in response to the magnitude of the identified strain.

12. The strain monitoring system of claim 11, wherein the at least one characteristic of the audible signal changes in response to a determined absolute value of the identified strain changes.

13. A method for monitoring a well cable, comprising:
    transmitting an optical input signal of a first one wavelength band across an optical fiber in the well cable, the well cable having a strain-responsive optical sensor operably coupled to the optical fiber;
    receiving a returned optical signal from the strain-responsive sensor;
    correlating the returned optical signal with a magnitude of strain exerted on the well cable; and
    generating an audio signal having at least one audible characteristic, wherein the audible characteristic of the audio signal changes in response to the magnitude of the strain, the audible characteristic being audible to a human operator.

14. The method of claim 13, wherein a well tool is coupled to the well cable, and wherein the strain-responsive optical sensor is situated proximate the coupling of the well cable to the well tool.

15. The method of claim 13, wherein the strain-responsive optical sensor includes a fiber Bragg grating formed in the optical fiber.

16. The method of claim 13, further comprising:
    receiving an optical temperature signal associated with the effects of temperature on the well cable containing the optical fiber; and
    wherein correlating the returned optical signal from the strain-responsive optical sensor with a magnitude of strain exerted on the well cable comprises compensating for effects of temperature on the optical fiber in response to the received optical temperature signal.

17. The method of claim 16, further comprising interrogating the optical fiber with a second optical input to perform a second optical measurement selected from the group consisting essentially of, a distributed temperature sensing measurement, a distributed strain sensing measurement, and a distributed acoustic sensing measurement.

18. The method of claim 16, receiving the optical temperature signal comprises:
   transmitting a second optical signal of a second wavelength band across an optical fiber in the well cable to interrogate a second optical sensor, the second optical sensor arranged to be substantially isolated from strain to which the first optical sensor is exposed so as to be primarily responsive to effects of temperature on the well cable.

19. The method of claim 18, wherein the strain-responsive optical sensor and the second optical sensor primarily responsive to effects of temperature are associated with the same optical fiber.

20. The method of claim 18, wherein the strain-responsive optical sensor and the second optical sensor primarily responsive to effects of temperature are each fiber Bragg gratings formed in an optical fiber.

21. The method of claim 18, wherein compensating for the effects of temperature comprises comparing a frequency shift of the received optical temperature signal to a frequency shift of a signal received from the strain responsive sensor and compensating the strain measurement for the effects of temperature.

\* \* \* \* \*